(12) United States Patent
Song et al.

(10) Patent No.: US 8,796,614 B2
(45) Date of Patent: Aug. 5, 2014

(54) APPARATUSES FOR GENERATING PROTON BEAM

(71) Applicant: Electronics and Telecommunications Research Institute, Daejeon (KR)

(72) Inventors: Dong Hoon Song, Daejeon (KR); Dong-Ho Shin, Daejeon (KR); Hwang Woon Lee, Daejeon (KR); Hyung Ju Park, Daejeon (KR); Moon Youn Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/888,315

(22) Filed: May 6, 2013

(65) Prior Publication Data
US 2013/0299716 A1    Nov. 14, 2013

(30) Foreign Application Priority Data

May 8, 2012    (KR) .................. 10-2012-0048691

(51) Int. Cl.
*G02B 5/00*    (2006.01)
*H01J 27/24*    (2006.01)

(52) U.S. Cl.
USPC .................. 250/251; 250/396 R; 250/492.1; 250/493.1; 315/500; 315/501; 315/502; 315/507; 315/509

(58) Field of Classification Search
USPC .................. 250/396 R, 492.1, 493.1, 251; 315/500–509
See application file for complete search history.

(56) References Cited

U.S. PATENT DOCUMENTS 4,175,830 A * 11/1979 Marie .................. 359/484.01
8,264,174 B2 * 9/2012 Liu et al. .................. 315/500

OTHER PUBLICATIONS

Polyanskiy et al., Prospects for Proton Accelerators Driven by the Radiation Pressure from a Sub-PW CO2 Laser, 2011, Proceedings of 2011 Particle Accelerator Conference, MOP154, pp. 379-381.*
Yan et al., Mono-energetic proton beams acceleratred by a circularly polarized laser pulse with a thin solid foil, No Date, No Publisher, No Edition or Volume information, pp. 1-10.*

* cited by examiner

*Primary Examiner* — David A Vanore (57) ABSTRACT

Provided is an apparatus for generating a proton beam, which includes a laser system providing a laser pulse, a target generating a proton beam by using the laser pulse, and a phase conversion plate disposed between the laser system as a light source and the target to convert the laser pulse into a circularly polarized laser pulse having a spiral shape.

14 Claims, 7 Drawing Sheets

APPARATUSES FOR GENERATING PROTON BEAM

CROSS-REFERENCE TO RELATED APPLICATIONS

This U.S. non-provisional patent application claims priority under 35 U.S.C. §119 of Korean Patent Application No. 10-2012-0048691, filed on May 8, 2012, the entire contents of which are hereby incorporated by reference.

BACKGROUND OF THE INVENTION

The present invention disclosed herein relates to an apparatus for generating a proton beam, and more particularly, to a proton beam generation apparatus using a laser beam.

Proton ion beam treatments are in the spotlight as treatment methods which can mitigate side effects due to X-ray treatments or electron beam treatments. To allow a proton ion beam to penetrate a material, the proton ion beam should be accelerated to have high velocity, like electrons. Even though the proton ion beam gradually decreases in velocity when the proton ion beam penetrates a certain material, the proton ion beam is subject to the most energy loss of ionizing radiation just before the proton ion beam is stopped. This phenomenon is called a Bragg peak after William Henry Bragg who discovered the phenomenon in 1903.

Thus, when the velocity of proton ions are precisely controlled, malignant tumors may be selectively and locally treated. When tumors are disposed at a deep position of the human body, protons or ions should be accelerated to a significantly high energy level at the outside of the human body. Methods of accelerating protons or ions may include a laser driven ion acceleration method. When a high-power laser beam is emitted to a thin film target, ions or protons within a thin film escape with acceleration energy by a target normal sheath acceleration model (TNSA model) or a radiation pressure acceleration model (RPA model). A proton ion beam may penetrate the body of a patient according to energy of the proton ion beam and be stuck in the location of a tumor. The patient can be treated according to the principle that a large amount of free oxygen radicals are generated in a tumor portion near protons to necrotize tumor cells.

In the initial stage of the study, a proton beam could be obtained using a particle accelerator. Today, a proton beam can be obtained using a laser system that is superior to a particle accelerator in terms of spatial constrain. The laser system can generate a large amount of proton beam by using a high power laser beam. Thus, various types of research and development are being carried out in order to obtain a proton beam having a mono-energetic distribution.

SUMMARY OF THE INVENTION

The present invention provides a proton beam generation apparatus that can obtain a mono-energetic proton beam.

The present invention also provides a proton beam generation apparatus that can improve productivity.

Embodiments of the present invention provide apparatuses for generating a proton beam, including: a laser system providing a laser pulse; a target generating a proton beam by using the laser pulse; and a phase conversion plate disposed between the laser system as a light source, the phase conversion plate circularly polarizing the laser pulse in a spiral shape.

In some embodiments, the phase conversion plate may include a plurality of sectors divided from a circle.

In other embodiments, the sectors may include first to $n_{th}$ quarter wave plates.

In still other embodiments, the first to $n_{th}$ quarter wave plates may include crystal quartz that shows birefringence about the laser pulse.

In even other embodiments, the first to $n_{th}$ quarter wave plates may have thicknesses that gradually increase in a rotation direction on the circle.

In yet other embodiments, each of second to $n_{th}$ sectors of the sectors may have a thickness corresponding to a multiple of the thickness of the first quarter wave plate.

In further embodiments, the phase conversion plate may include a plurality of sub sector blocks arrayed in a circular shape.

In still further embodiments, each of the sub sector blocks may include a plurality of sub quarter wave plates.

In even further embodiments, the phase conversion plate may include inner phase conversion plates arrayed in a circular shape, and outer phase conversion plates surrounding the inner phase conversion plates.

In yet further embodiments, the inner phase conversion plates may include a plurality of inner quarter wave plates.

In much further embodiments, the outer phase conversion plates may include a plurality of outer sub sector blocks.

In still much further embodiments, the outer sub sector blocks may include a plurality of outer sub quarter wave plates.

In even much further embodiments, the laser system may include a chirped pulse amplification module.

In yet much further embodiments, the chirped pulse amplification module may include a source generating the laser pulse, and an amplifier increasing power of the laser pulse.

In yet much further embodiments, the source may include a titanium-sapphire crystal gain medium.

In yet much further embodiments, the chirped pulse amplification module may further include: a pulse stretcher disposed between the source and the amplifier to increase a wavelength of the laser pulse; and a compressor disposed between the amplifier and the phase conversion plate to decrease a pulse-width of the laser pulse.

In yet much further embodiments, the pulse stretcher may include an offner-triplet type reflective optical system.

In yet much further embodiments, the offner-triplet type reflective optical system may include: a plurality of first diffraction lattices that diffract the laser pulse; a plurality of convex lenses disposed between the first diffraction lattices; a first input/output mirror that inputs and outputs the laser pulse as a laser beam to and from any one of the first diffraction lattices; and a concave mirror that reflects the laser beam to the other one of the first diffraction lattices.

In yet much further embodiments, the compressor may include: a plurality of second diffraction lattices that diffract the laser pulse; a second input/output mirror that inputs and outputs the laser pulse diffracted by any one of the second diffraction lattices; and a second concave mirror that reflects the laser pulse to the other one of the second diffraction lattices.

In yet much further embodiments, the chirped pulse amplification module may further include a plurality of mirrors or half mirrors that transmit the laser pulse between the source, the pulse stretcher, the amplifier, and the compressor.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

It should be construed that foregoing general illustrations and following detailed descriptions are exemplified to provide an additional explanation of the claimed invention. Thus, the present invention should not be construed as limited to the embodiments set forth herein and may be embodied in different forms. These embodiments are provided so that this disclosure will be thorough and complete, and will fully convey the scope of the present invention to those skilled in the art.

In this specification, when it is described that one comprises (or includes or has) some elements, it should be understood that it may comprise (or include or has) only those elements, or it may comprise (or include or have) other elements as well as those elements if there is no specific limitation. In addition, each embodiment described and exemplified herein includes a complementary embodiment thereof. Hereinafter, embodiments of the present invention will be described in detail with reference to the accompanying drawings.

Figure 1:
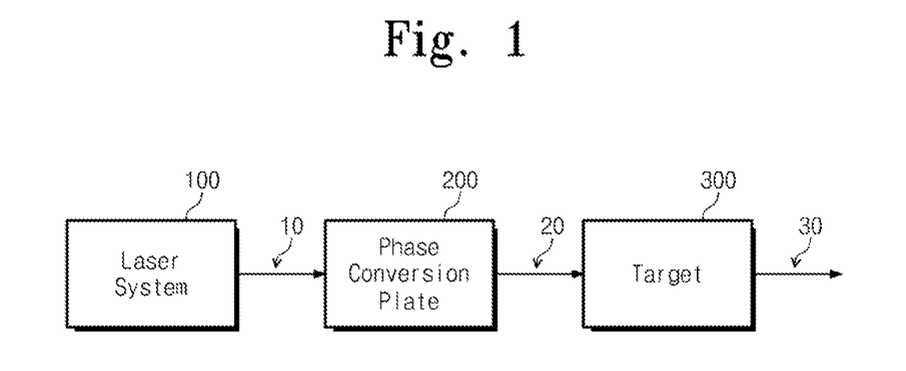
FIG. 1 is a schematic view illustrating a proton beam generation apparatus according to an embodiment of the present invention.
Figure 2:
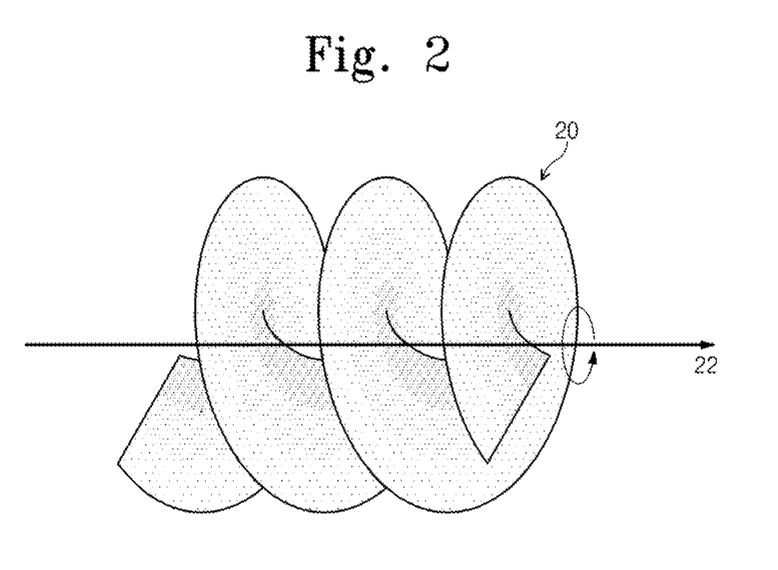
FIG. 2 is a view illustrating a circularly polarized laser pulse of FIG. 1.

Referring to FIGS. 1 and 2, a proton beam generation apparatus according to an embodiment of the present invention may include a laser system 100, a phase conversion plate 200, and a target 300. The laser system 100 may include a chirped pulse amplification (CPA) module that generates a linearly polarized laser pulse 10. The phase conversion plate 200 may convert the linearly polarized laser pulse 10 into a circularly polarized laser pulse 20. The circularly polarized laser pulse 20 may be incident to the target 300, along a spiral shape in a propagation direction 22. Other words, the phase conversion plate 200 may circularly polarize the laser pulse in a spiral shape. The target 300 is a source of a proton beam 30 and may include a carbon material or hydrogen. The circularly polarized laser pulse 20 can generate a large amount of the proton beam 30 of single energy, relative to the linearly polarized laser pulse 10.

Thus, the proton beam generation apparatus according to the current embodiment can improve productivity.

Figure 3:
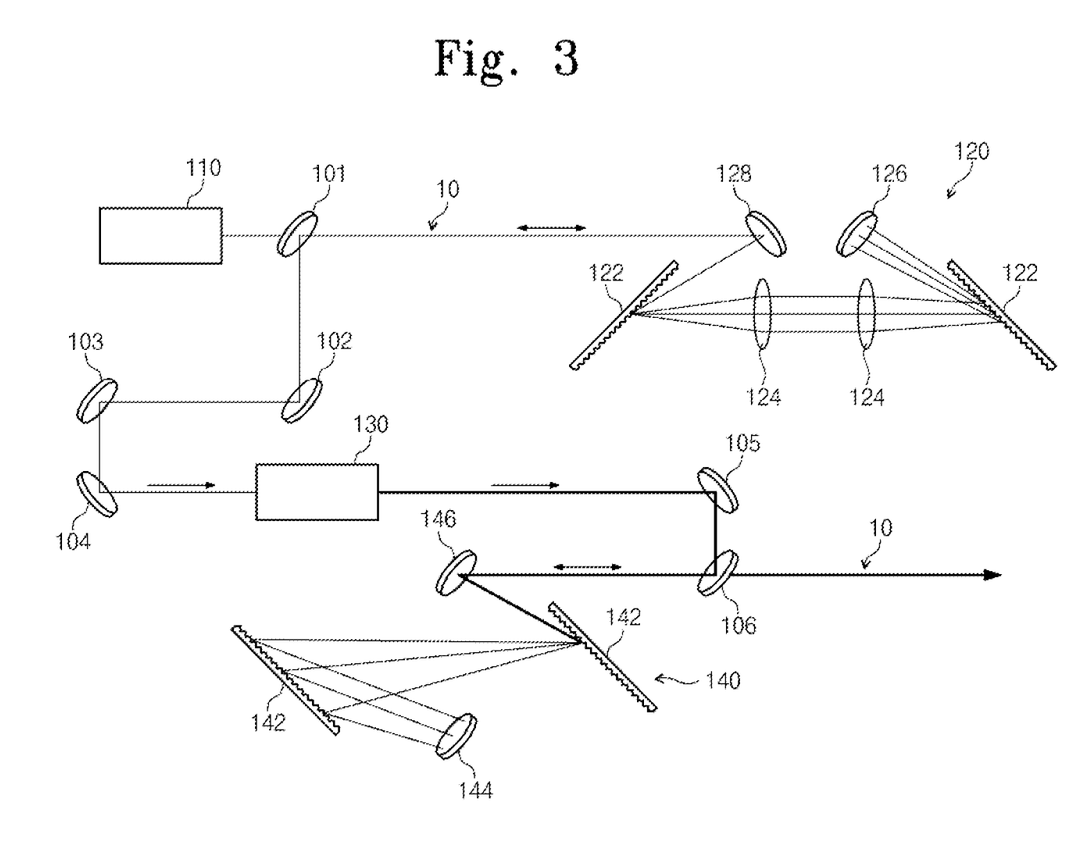
FIG. 3 is a view illustrating a laser system of FIG. 1.

Referring to FIGS. 1 and 3, the laser system 100 may include a source 110, a pulse stretcher 120, an amplifier 130, and a compressor 140. The source 110 may generate the linearly polarized laser pulse 10 having a micro wavelength. For example, the source 110 may include a titanium-sapphire crystal gain medium that generates a laser beam with a P-polarized pulse having a wavelength ranging from about 650 nm to about 1100 nm. The P-polarized pulse is the linearly polarized laser pulse 10. The P-polarized pulse may be used for an ultra short laser using another gain medium. A first half mirror 101 may be disposed between the source 110 and the pulse stretcher 120. The first half mirror 101 may transmit the linearly polarized laser pulse 10 propagating from the source 110 to the pulse stretcher 120.

The pulse stretcher 120 may increase a wavelength of a laser beam. The pulse stretcher 120 may increase a femtosecond pulse width up to a picosecond or nanosecond pulse width by using a positive high order dispersion value. The pulse stretcher 120 may include an offner-triplet type reflective optical system. The offner-triplet type reflective optical system may include a plurality of first diffraction lattices 122, convex lenses 124 disposed between the first diffraction lattices 122, a concave mirror 126, and a first input/output mirror 128.

The first diffraction lattices 122 may determine an increasing wavelength of the linearly polarized laser pulse 10. The first diffraction lattices 122 may face each other in non-parallel or in parallel. The convex lenses 124 may focus the linearly polarized laser pulse 10 on the first diffraction lattices 122, respectively. The linearly polarized laser pulse 10 between the convex lenses 124 may be a parallel laser beam. The first diffraction lattices 122 may diffract the linearly polarized laser pulse 10. The concave mirror 126 may reflect the linearly polarized laser pulse 10 diffracted from one of the first diffraction lattices 122. The concave mirror 126 may reflect the linearly polarized laser pulse 10 as a parallel laser beam to the first diffraction lattices 122. In this case, the concave mirror 126 may have a radius of curvature that is two times greater than that of the convex lenses 124. The first input/output mirror 128 may reflect the linearly polarized laser pulse 10 from the source 110 to the other one of the first diffraction lattices 122, and reflect the linearly polarized laser pulse 10 again from the first diffraction lattices 122 to the source 110. The linearly polarized laser pulse 10 is reflected with different wavelengths on the first input/output mirror 128 and is thus free from interference.

At this point, the pulse stretcher 120 may generate the linearly polarized laser pulse 10 having a pulse width (at picosecond or nanosecond level) increased according to a positive group delay dispersion value. The positive group delay dispersion value may be determined according to a function of a lattice constant and a diffraction angle of the first diffraction lattices 122, an incident angle of the first input/output mirror 128, and a distance between the concave mirror 126 and the first diffraction lattices 122. Thus, the linearly polarized laser pulse 10 provided to the amplifier 130 by the pulse stretcher 120 may have a pulse width greater than that of the source 110.

The first half mirror 101 may reflect the linearly polarized laser pulse 10, propagating from the pulse stretcher 120 to the source 110, to a second mirror 102. The second mirror 102, a third mirror 103, and a fourth mirror 104 may reflect the linearly polarized laser pulse 10 to the amplifier 130.

The amplifier 130 may increase output power of the linearly polarized laser pulse 10. The amplifier 130 may include the same gain medium as that of the source 110. The gain medium may regenerate the linearly polarized laser pulse 10 as a high power pulse by using the linearly polarized laser pulse 10 provided from the pulse stretcher 120, as pump light. The linearly polarized laser pulse 10 provided by the amplifier 130 may have the same wavelength as a wavelength at the source 110. A fifth mirror 105 and a second half mirror 106 may reflect the linearly polarized laser pulse 10 from the amplifier 130 to the compressor 140.

The compressor 140 may decrease the pulse width of the linearly polarized laser pulse 10 by using a negative dispersion value. The compressor 140 may output the linearly polarized laser pulse 10 at a femtosecond level. For example, the compressor 140 may include a plurality of second diffraction lattices 142, a second concave mirror 144, and a second input/output mirror 146. The distance between the second diffraction lattices 142 may smaller than that between the first diffraction lattices 122. The second input/output mirror 146 may reflect the linearly polarized laser pulse 10 to one of the second diffraction lattices 142. The second diffraction lattices 142 and the second concave mirror 144 may decrease the pulse width of the linearly polarized laser pulse 10. The second diffraction lattices 142 may diffract the linearly polarized laser pulse 10 to the second concave mirror 144. The second concave mirror 144 may reflect the linearly polarized laser pulse 10 to the second diffraction lattices 142.

As described above, the pulse width of the linearly polarized laser pulse 10 may be decreased by the negative dispersion value. The negative dispersion value may be determined according to a function of a lattice constant and a diffraction angle of the second diffraction lattices 142, an incident angle of the second input/output mirror 146, and a distance between the second diffraction lattices 142. The second half mirror 106 may transmit the linearly polarized laser pulse 10, output from the second input/output mirror 146 of the compressor 140, to the phase conversion plate 200.

Thus, the laser system 100 can provide the linearly polarized laser pulse 10 as a high power pulse to the phase conversion plate 200.

The phase conversion plate 200 may convert the linearly polarized laser pulse 10 as a high power pulse into the circularly polarized laser pulse 20 having orbit angular momentum.

The orbit angular momentum is a physical value obtained by quantizing the linearly polarized laser pulse 10 and is a unit-less value. The circularly polarized laser pulse 20 may have an orbit angular momentum of an integer multiple of $\pi$ radians or $2\pi$ radians corresponding to 360°.

For example, the phase conversion plate 200 will now be described with reference to FIGS. 4 to 9 according to amounts of orbit angular momentum of the circularly polarized laser pulse 20.

Figure 4:
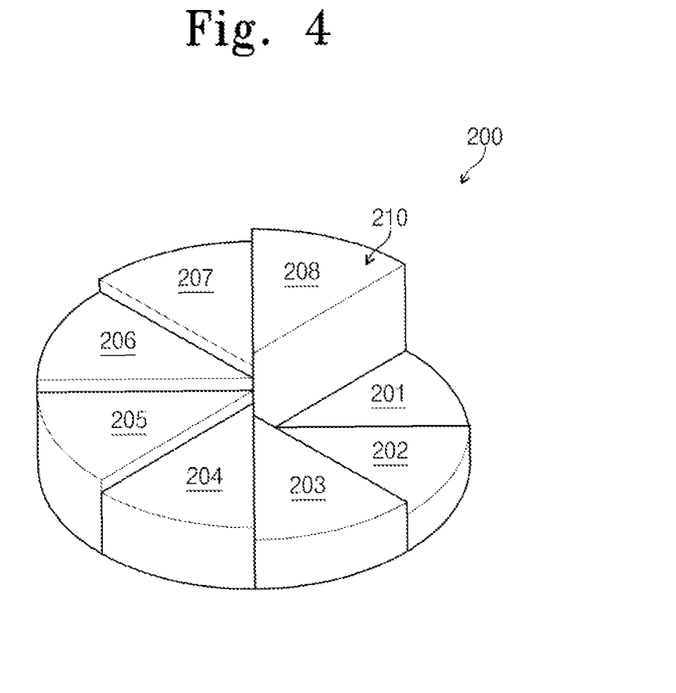
FIG. 4 is a perspective view illustrating a phase conversion plate that provides a circularly polarized laser pulse having an orbit angular momentum of 1.
Figure 5:
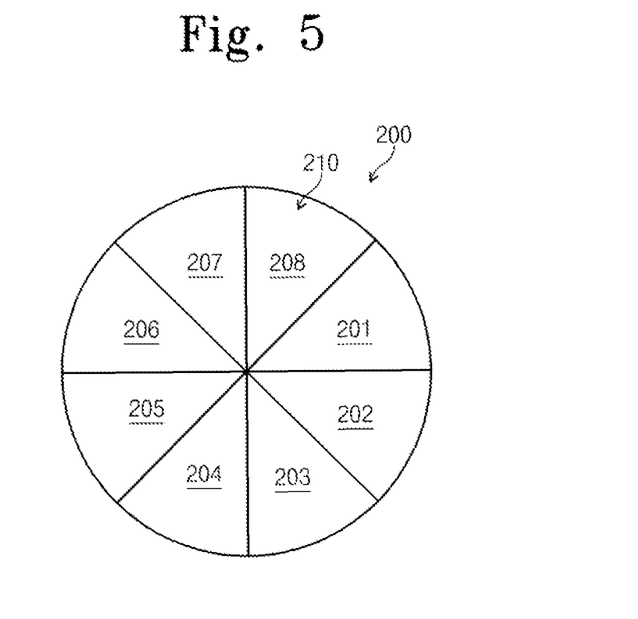
FIG. 5 is a plan view illustrating the phase conversion plate of FIG. 4.

Referring to FIGS. 4 and 5, the phase conversion plate 200 may include a plurality of sectors 210 that are divided from a circle in an azimuthal direction. The sectors 210 may include a crystal showing birefringence. The sectors 210 may include first to eighth quarter wave plates 201, 202, 203, 204, 205, 206, 207, and 208. The first to eighth quarter wave plates 201, 202, 203, 204, 205, 206, 207, and 208 may be formed by dividing a circle of 360° by 45°. The first to eighth quarter wave plates 201, 202, 203, 204, 205, 206, 207, and 208 may convert the linearly polarized laser pulse 10 into the circularly polarized laser pulse 20 having a spiral shape. In addition, the circularly polarized laser pulse 20 may be shifted by a phase of $2\pi$ radians by the first to eighth quarter wave plates 201, 202, 203, 204, 205, 206, 207, and 208. The first and eighth quarter wave plates 201 and 208 may generate a phase difference $\psi$ of an integer multiple of $2\pi$ radians about the circularly polarized laser pulse 20. An orbit angular momentum L of the circularly polarized laser pulse 20 may be 1. In addition, since the linearly polarized laser pulse 10 of a microwave having a femtosecond wavelength or a terahertz frequency has a significantly wide wavelength, the circularly polarized laser pulse 20 may have a phase difference corresponding to an integer multiple of $\pi$ radians by the first to eighth quarter wave plates 201, 202, 203, 204, 205, 206, 207, and 208.

In addition, the first to eighth quarter wave plates 201, 202, 203, 204, 205, 206, 207, and 208 may have thicknesses that sequentially and uniformly increase. That is, the second to eighth quarter wave plates 202, 203, 204, 205, 206, 207, and 208 may have thicknesses, respectively, which gradually increase by the thickness of the first quarter wave plate 201. That is, the thickness of the eighth quarter wave plate 208 may be eight times greater than that of the first quarter wave plate 201. However, embodiments of the present invention are not limited thereto. For example, the phase conversion plate 200 may include first to $n_{th}$ quarter wave plates, and efficiency of the circularly polarized laser pulse 20 may be improved as the number of first to $n_{th}$ sectors 210 increases.

Figure 6:
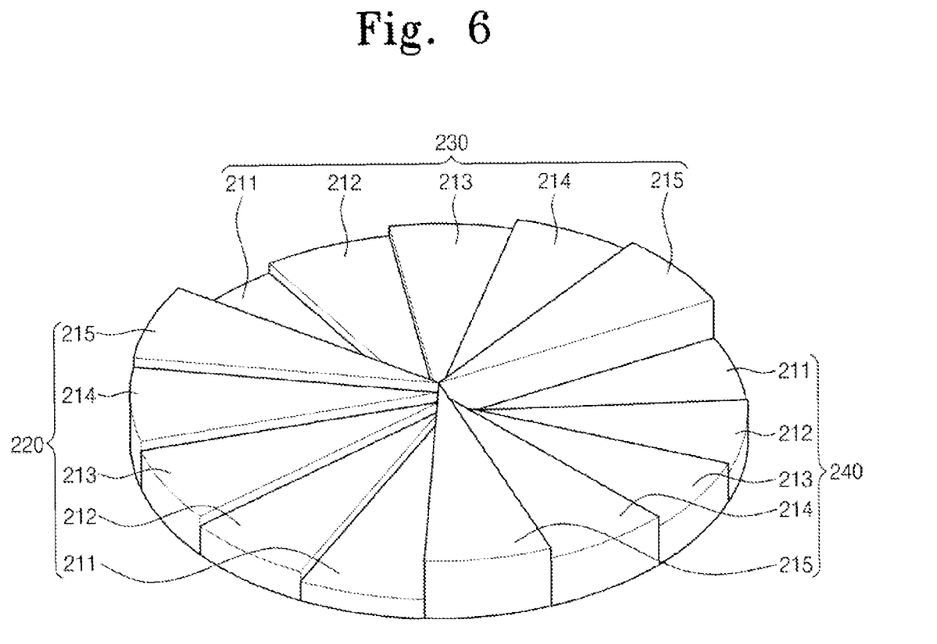
FIG. 6 is a perspective view illustrating a phase conversion plate that provides a circularly polarized laser pulse having an orbit angular momentum of 3.
Figure 7:
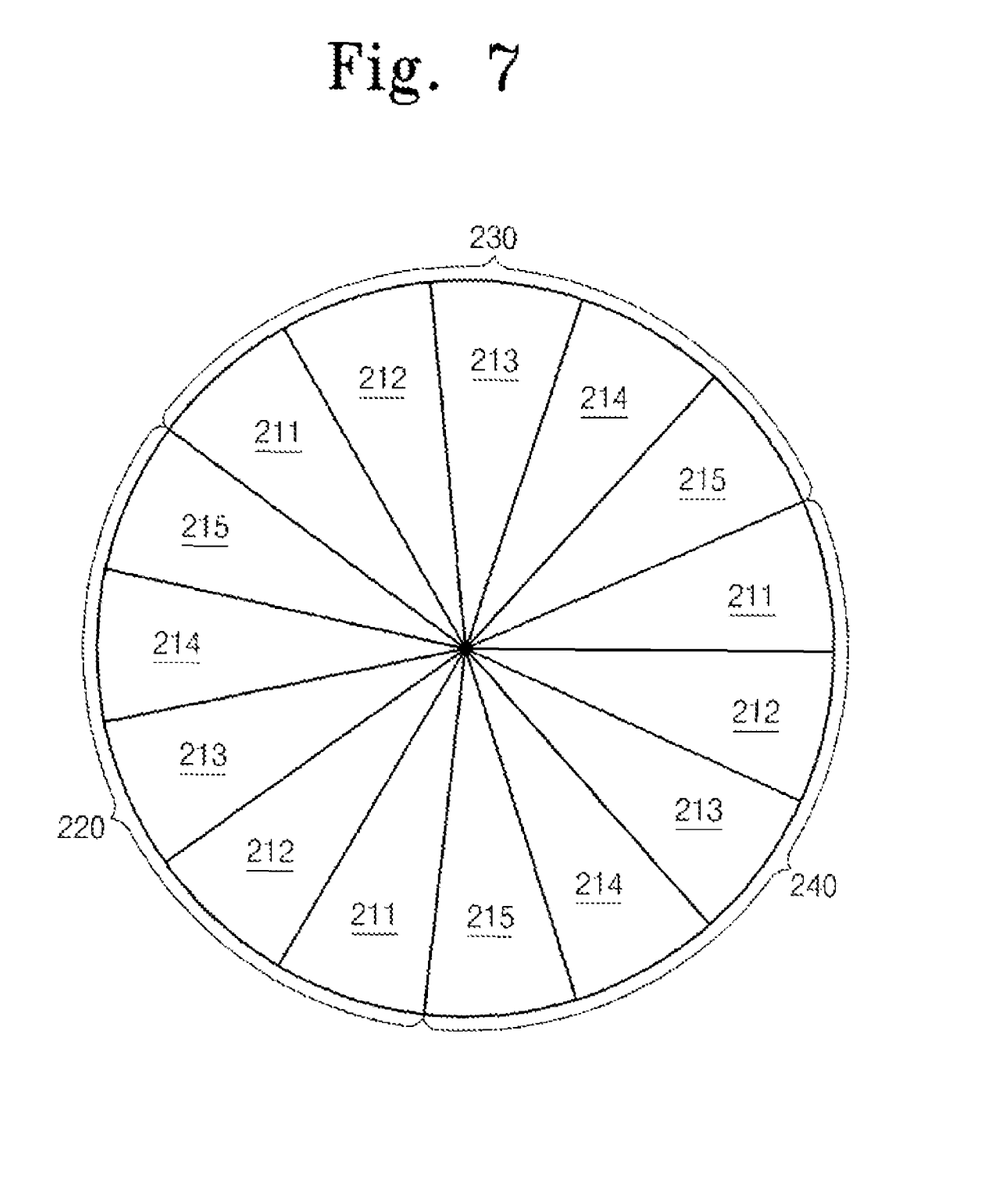
FIG. 7 is a plan view illustrating the phase conversion plate of FIG. 6.

Referring to FIGS. 6 and 7, a phase conversion plate 200 may include first to third sector blocks 220, 230, and 240. The circularly polarized laser pulse 20 provided by the first to third sector blocks 220, 230, and 240 may have an orbit angular momentum of 3. Each of the first to third sector blocks 220, 230, and 240 may take 120° from 360°. Each of the first to third sector blocks 220, 230, and 240 may include first to fifth sub quarter wave plates 211, 212, 213, 214, and 215. The first to fifth sub quarter wave plates 211, 212, 213, 214, and 215 may shift the circularly polarized laser pulse 20 by a phase of $2\pi$ radians. The thickness of the fifth sub quarter wave plate 215 may be about 5 times greater than that of the first sub quarter wave plate 211.

Thus, the circularly polarized laser pulse 20 provided by the phase conversion plate 200 using the first to third sector blocks 220, 230, and 240 may have an angular momentum of 3.

Figure 8:
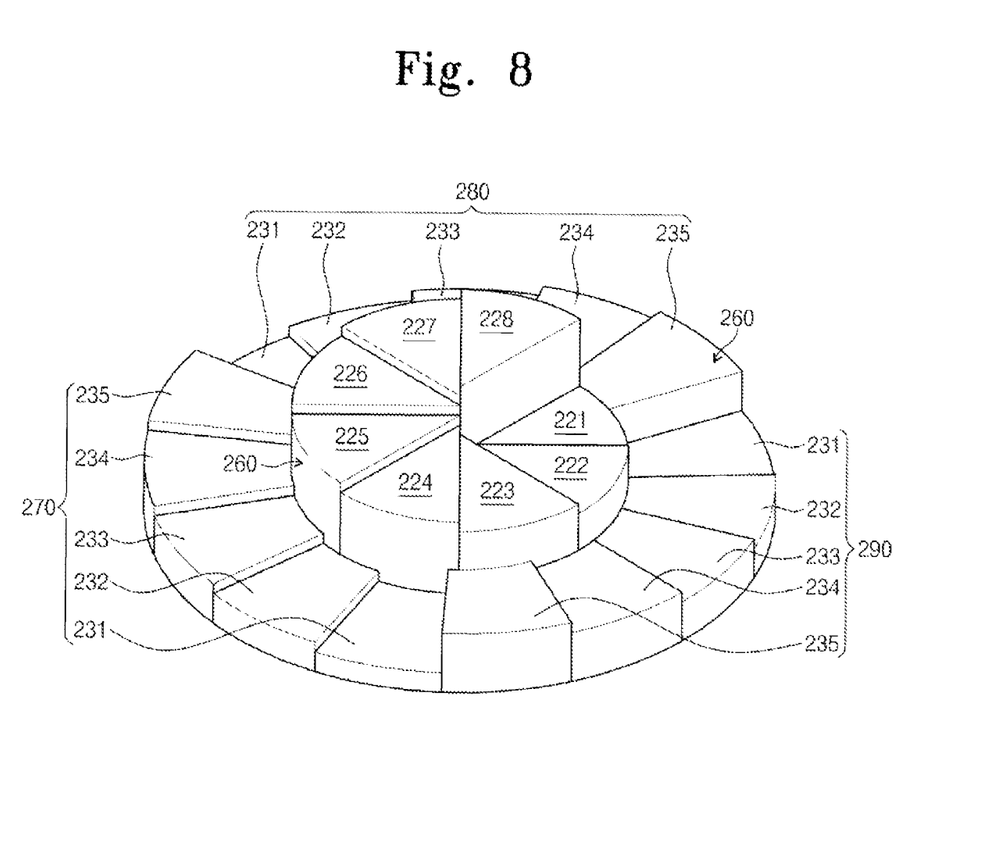
FIG. 8 is a perspective view illustrating a phase conversion plate that provides a circularly polarized laser pulse having an orbit angular momentum of 1 and an orbit angular momentum of 3.
Figure 9:
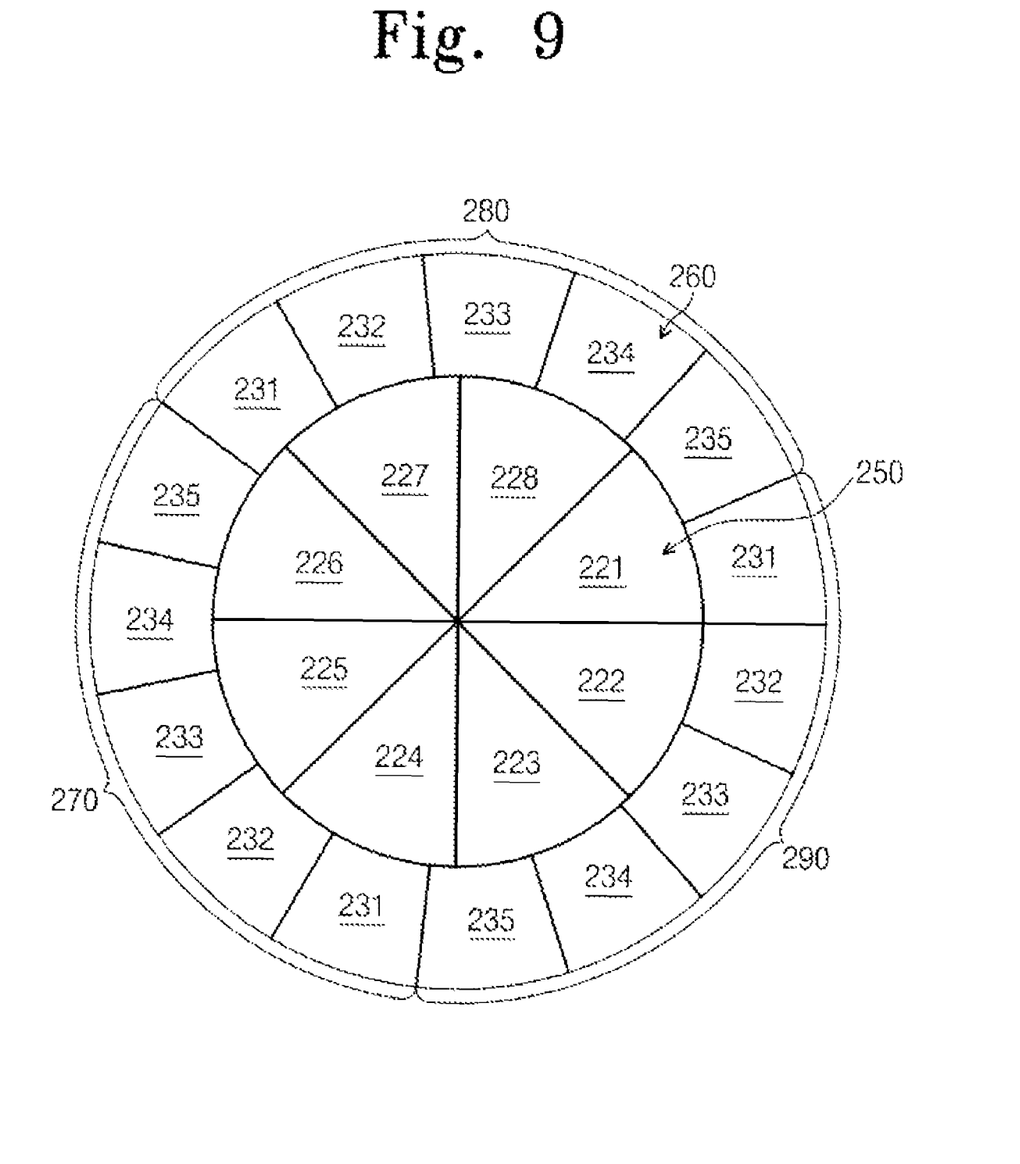
FIG. 9 is a plan view illustrating the phase conversion plate of FIG. 8.

Referring to FIGS. 8 and 9, a phase conversion plate 200 having double orbit angular momentum may include an inner phase conversion plate 250 and an outer phase conversion plate 260. The inner phase conversion plate 250 may include first to eighth inner quarter wave plates 221, 222, 223, 224, 225, 226, 227, and 228. The circularly polarized laser pulse 20 provided by the inner phase conversion plate 250 may have an angular momentum of 1. The outer phase conversion plate 260 may include first to third outer sector blocks 270, 280, and 290. Each of the first to third outer sector blocks 270, 280, and 290 may include first to fifth outer sub quarter wave plates 231, 232, 233, 234, and 235. The circularly polarized laser pulse 20 provided by the outer phase conversion plate 260 may have an orbit angular momentum of 3.

Thus, the phase conversion plate 200 can convert a linearly polarized laser pulse 10 into a circularly polarized laser pulse 20 having various amounts of orbit angular momentum. The circularly polarized laser pulse 20 may generate a proton beam 30 having a function according to amounts of orbit angular momentum.

As a result, a proton beam generation apparatus according to the embodiments of the present invention can improve productivity.

A proton beam generation apparatus according to the embodiments of the present invention may include a phase conversion plate between a laser system and a target to convert a linearly polarized laser pulse into a circularly polarized laser pulse. Phase conversion plates may include a plurality of sectors divided from a circle in an azimuthal direction. The sectors may include first to $n_{th}$ quarter wave plates. The first to $n_{th}$ quarter wave plates may convert a linearly polarized laser pulse into a circularly polarized laser pulse. The circularly polarized laser pulse may generate a large amount of a proton beam having a mono-energetic distribution.

Thus, a proton beam generation apparatus according to the embodiments of the present invention can improve productivity.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for generating a proton beam, comprising:
    a laser system providing a laser pulse;
    a target generating a proton beam by using the laser pulse; and
    a phase conversion plate disposed between the laser system, the phase conversion plate circularly polarizing the laser pulse in a spiral shape,
    wherein the phase conversion plate comprises a plurality of sub sector blocks arrayed in a circular shape.

2. The apparatus of claim 1, wherein each of the sub sector blocks comprises a plurality of sub quarter wave plates.

3. The apparatus of claim 1, wherein the phase conversion plate comprises inner phase conversion plates arrayed in a circular shape, and outer phase conversion plates surrounding the inner phase conversion plates.

4. The apparatus of claim 3, wherein the inner phase conversion plates comprise a plurality of inner quarter wave plates.

5. The apparatus of claim 3, wherein the outer phase conversion plates comprise a plurality of outer sub sector blocks.

6. The apparatus of claim 5, wherein the outer sub sector blocks comprise a plurality of outer sub quarter wave plates.

7. The apparatus of claim 1, wherein the laser system comprises a chirped pulse amplification module.

8. The apparatus of claim 7, wherein the chirped pulse amplification module comprises a source generating the laser pulse, and an amplifier increasing power of the laser pulse.

9. The apparatus of claim 8, wherein the source comprises a titanium-sapphire crystal gain medium.

10. The apparatus of claim 8, wherein the chirped pulse amplification module further comprises;
    a pulse stretcher disposed between the source and the amplifier to increase a pulse width of the laser pulse; and
    a compressor disposed between the amplifier and the phase conversion plate to decrease a pulse width of the laser pulse.

11. The apparatus of claim 10, wherein the pulse stretcher comprises an offner-triplet type reflective optical system.

12. The apparatus of claim 11, wherein the offner-triplet type reflective optical system comprises:
    a plurality of first diffraction lattices that diffract the laser pulse;
    a plurality of convex lenses disposed between the first diffraction lattices;
    a first input/output mirror that inputs and outputs the laser pulse as a laser beam to and from any one of the first diffraction lattices; and
    a concave mirror that reflects the laser beam to the other one of the first diffraction lattices.

13. The apparatus of claim 10, wherein the compressor comprises:
    a plurality of second diffraction lattices that diffract the laser pulse;
    a second input/output mirror that inputs and outputs the laser pulse diffracted by any one of the second diffraction lattices; and
    a second concave mirror that reflects the laser pulse to the other one of the second diffraction lattices.

14. The apparatus of claim 10, wherein the chirped pulse amplification module further comprises a plurality of mirrors or half mirrors that transmit the laser pulse between the source, the pulse stretcher, the amplifier, and the compressor.

* * * * *